Figure 1:
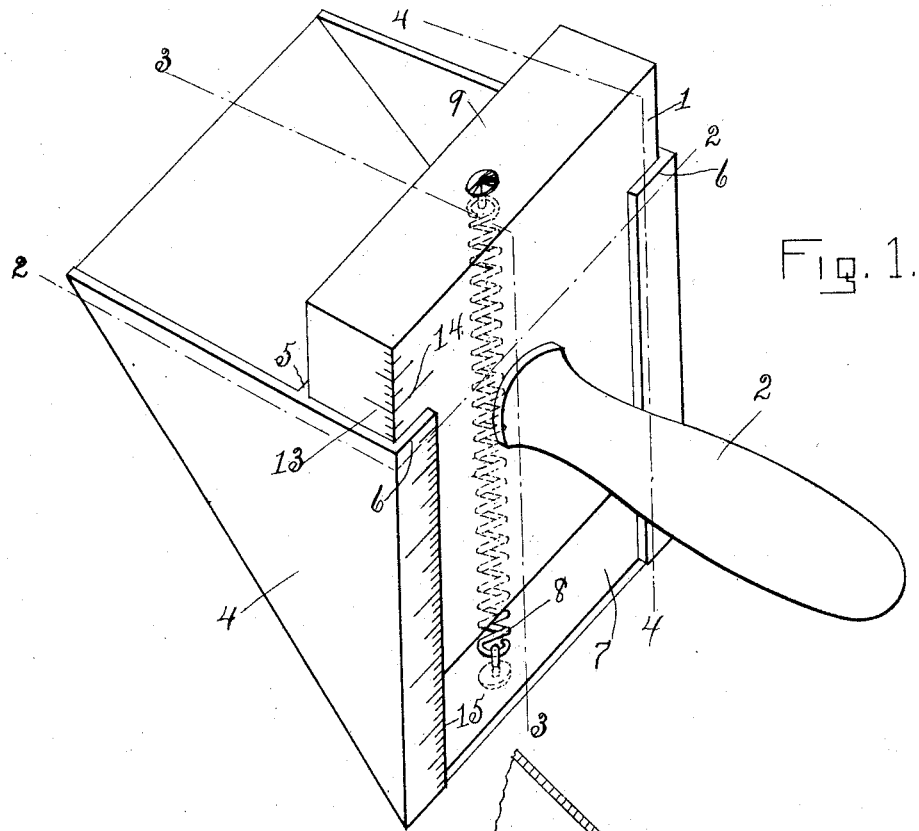

F. A. W. KELLEY.
BALANCE SCOOP SCALE.
APPLICATION FILED APR. 29, 1910.

983,554.

Patented Feb. 7, 1911.
2 SHEETS—SHEET 1.

WITNESSES
J. E. Donsbach.
Wm. G. Zepf.

INVENTOR
Frederick A. W. Kelley.
BY
Mosher & Curtis
ATTORNEYS.

F. A. W. KELLEY.
BALANCE SCOOP SCALE.
APPLICATION FILED APR. 29, 1910.
983,554.
Patented Feb. 7, 1911.
2 SHEETS—SHEET 2.
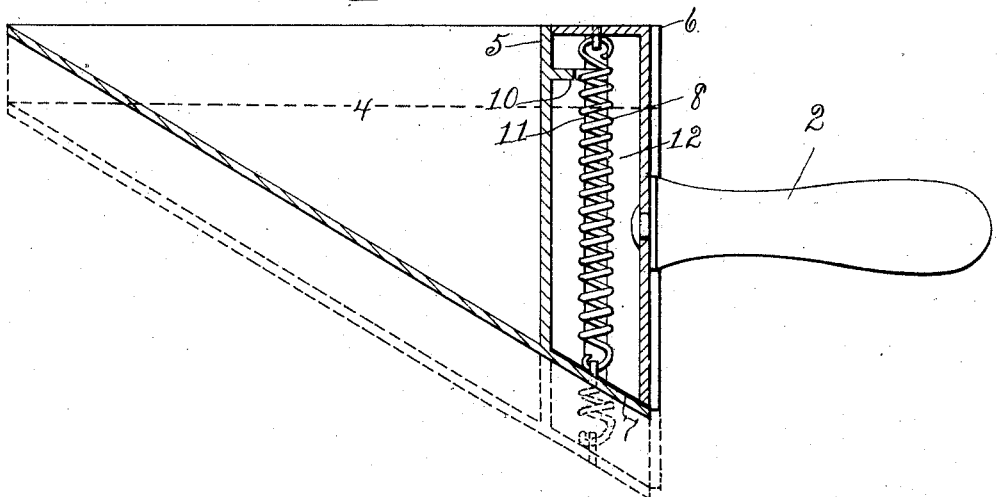
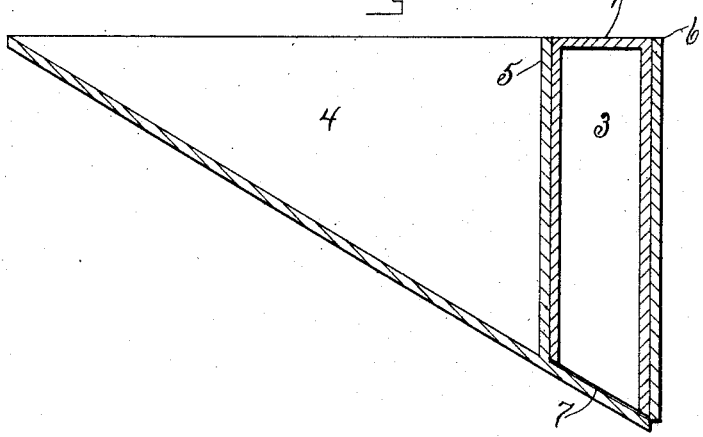
WITNESSES
J. E. Donobach
Wm. G. Zepf
INVENTOR
Frederick A. W. Kelley,
BY
Mosher & Curtis
ATTORNEYS

UNITED STATES PATENT OFFICE.

FREDERICK A. W. KELLEY, OF WATERVLIET, NEW YORK, ASSIGNOR, BY DIRECT AND MESNE ASSIGNMENTS, TO TROY SCALE COMPANY, OF TROY, NEW YORK, A CORPORATION OF NEW YORK.

BALANCE-SCOOP SCALE.

983,554. Specification of Letters Patent. Patented Feb. 7, 1911.

Application filed April 29, 1910. Serial No. 558,377.

*To all whom it may concern:*

Be it known that I, FREDERICK A. W. KELLEY, a citizen of the United States, residing at Watervliet, county of Albany, and State of New York, have invented certain new and useful Improvements in Balance-Scoop Scales, of which the following is a specification.

The invention relates to such improvements and consists of the novel construction and combination of parts hereinafter described and subsequently claimed.

Reference may be had to the accompanying drawings, and the reference characters marked thereon, which form a part of this specification. Similar characters refer to similar parts in the several figures therein.

Figure 2:
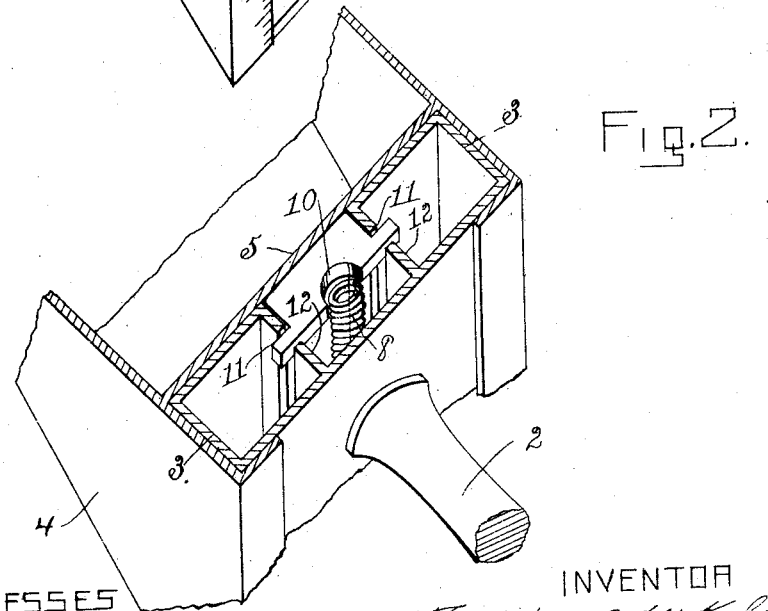

Figure 1 of the drawings is a view in perspective of my improved balance-scoop scale. Fig. 2 is a horizontal section of the same taken on the broken line 2—2 in Fig. 1, shown in perspective. Fig. 3 is a central, vertical, longitudinal section of the same taken on the broken line 3—3 in Fig. 1. Fig. 4 is a vertical, longitudinal section taken on the broken line 4—4 in Fig. 1.

The principal object of my invention is to provide a hand-scoop with weighing mechanism, whereby merchandise can be conveniently handled and weighed in small quantities.

Other objects will appear in connection with the following description.

Referring to the drawings wherein the invention is shown in preferred form, 1, represents the hand-supported head of the device having the laterally projecting handle, 2, said head being preferably formed of sheet-metal, and having hollow columns, 3, along its vertical ends.

The scoop-pan, 4, is slidably mounted upon the head, 1, by means of the inner end-wall, 5, of the pan, and the rectangular flanges, 6, between which rectangular flanges, 6, and the inner end-wall, 5, of the pan the respective hollow columns, 3, are confined, with freedom for slide-movement.

The bottom-wall, 7, of the scoop-pan is connected by a coil-spring, 8, with the top-wall, 9, of the head, 1, said spring tending to yieldingly hold the scoop-pan and head together.

As a further guiding means, if desired, I have shown the scoop-pan provided with a T-shaped laterally projecting guide, 10, the T-ends of which are adapted to slide in vertical slots, 11, formed in the vertical inner walls, 12, of the hollow columns 3.

The head, 1, is provided with one or more graduated scales, as shown at 13 and 14, adapted to be read in connection with the top of the scoop-pan, and to indicate the weight of the contents of the scoop, said scale being graduated in accordance with the strength of the spring, 8, to indicate said weight with substantial correctness.

The bottom of the scoop-pan is preferably inclined sharply inward and downward from its outer end, so that when the head, 1, is held in vertical position the contents of the scoop will be deposited at the inner lower end of the scale-pan, where the weight will exert the least tendency to cause binding friction between the sliding members.

The head and scoop-pan can be made of any desired material, but I prefer to make them both of sheet-metal. For convenience of illustration, however, the soldered joints are not shown.

If desired, a graduated scale may be placed upon the scoop-pan, as shown at 15, to be read in connection with the bottom edge of the head 1.

What I claim as new and desire to secure by Letters Patent is—

1. In a device of the class described, and in combination, a scoop-pan having a vertical inner end-wall; and a vertical rectangular flange parallel with said wall at each end thereof; a supporting-head occupying the space between said inner end-wall and said rectangular flanges; a handle for said supporting-head; and a spring-connection between said supporting-head and said scoop-pan.

2. In a device of the class described, and in combination, a scoop-pan having a vertical inner end-wall, and its bottom inclined inward and downward toward the bottom of said end-wall, and having members coöperating with said end-wall to form vertical slideways, and having hollow vertical columns provided in their neighboring walls with vertical slots; a guide fixed to said inner wall of the scoop-pan, having members adapted to play in said slots; a spring-connection between said scoop-pan and said supporting-head and a handle for said supporting-head.

In testimony whereof, I have hereunto set my hand this 25th day of April, 1910.

FREDERICK A. W. KELLEY.

Witnesses:
 FRANK C. CURTIS,
 J. E. DONSBACH.